United States Patent [19]

Smith

[11] Patent Number: 4,691,514

[45] Date of Patent: Sep. 8, 1987

[54] WATER ENGINE

[75] Inventor: Iain M. Smith, Rochdale, England

[73] Assignee: Aur Hydropower Limited, London, England

[21] Appl. No.: 898,542

[22] Filed: Aug. 4, 1986

Related U.S. Application Data

[63] Continuation-in-part of Ser. No. 583,546, Feb. 24, 1984, abandoned.

[30] Foreign Application Priority Data

Feb. 25, 1983 [GB] United Kingdom ............... 8305334

[51] Int. Cl.⁴ ............................................. F03N 13/12
[52] U.S. Cl. ........................................ 60/503; 60/506
[58] Field of Search ................. 60/502, 503, 505, 506

[56] References Cited

U.S. PATENT DOCUMENTS

| | | | |
|---|---|---|---|
| 921,637 | 5/1909 | Vanderslice | 60/503 |
| 962,382 | 6/1910 | Osborn | 60/503 |
| 999,579 | 8/1911 | Mecham | 60/503 |
| 1,496,470 | 6/1924 | Knowlton | 60/503 |
| 4,034,565 | 7/1977 | McVeigh | 60/505 |

Primary Examiner—Allen M. Ostrager
Attorney, Agent, or Firm—Kenyon & Kenyon

[57] ABSTRACT

A water engine comprises two floats arranged to reciprocate vertically in respective water chambers. Water is admitted to each chamber in turn from a head of water and then allowed to exhaust to a lower level, thereby causing the floats to rise and fall. The floats drive a pivotally mounted beam and power is derived from the beam movement by means of hydraulic rams.

8 Claims, 10 Drawing Figures

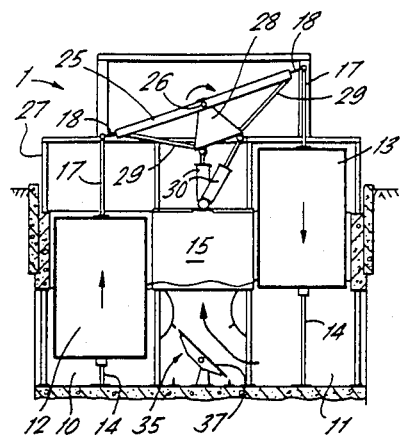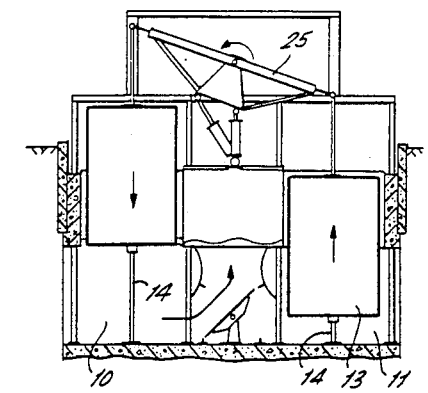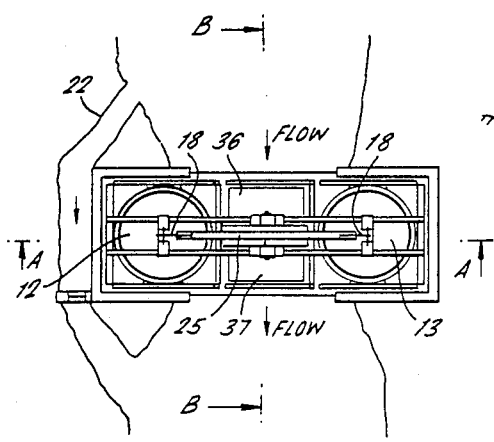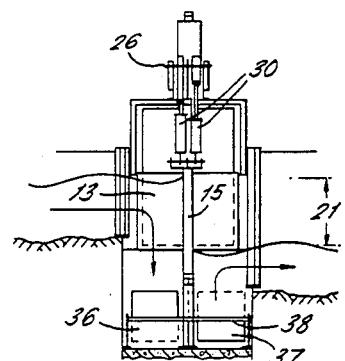

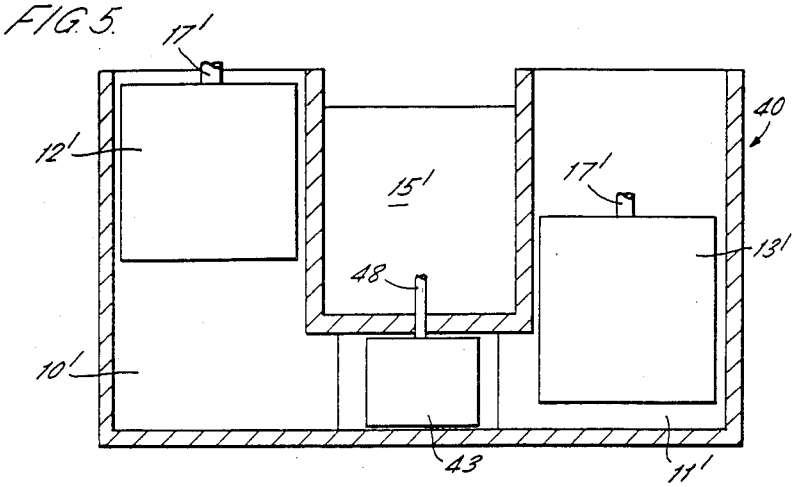
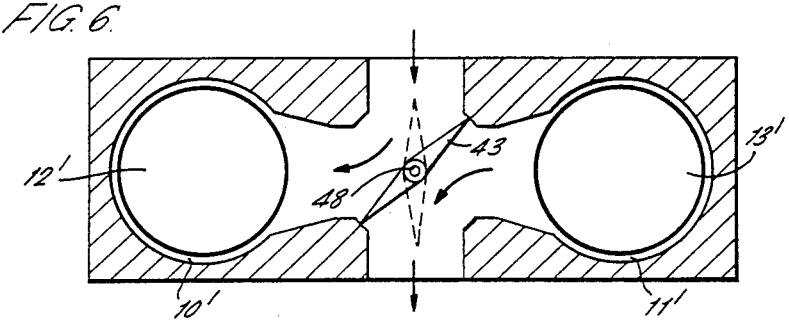
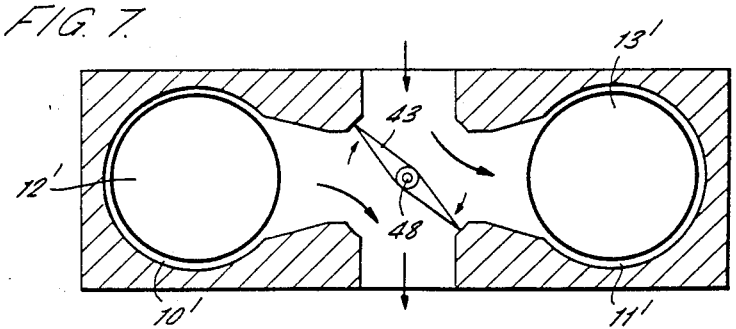

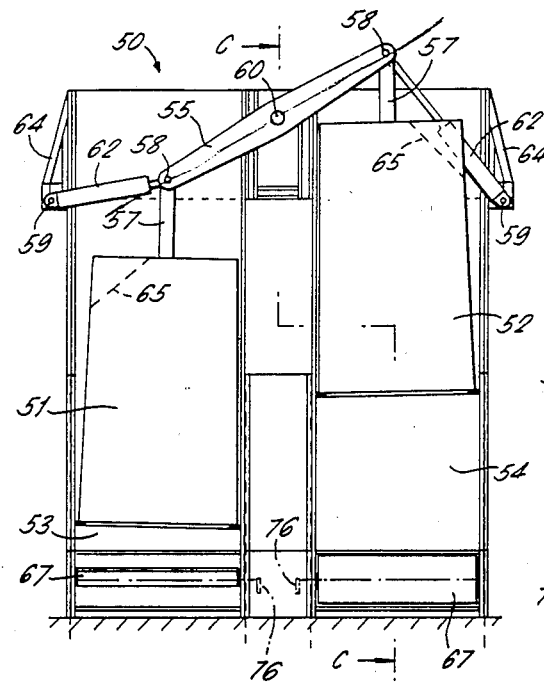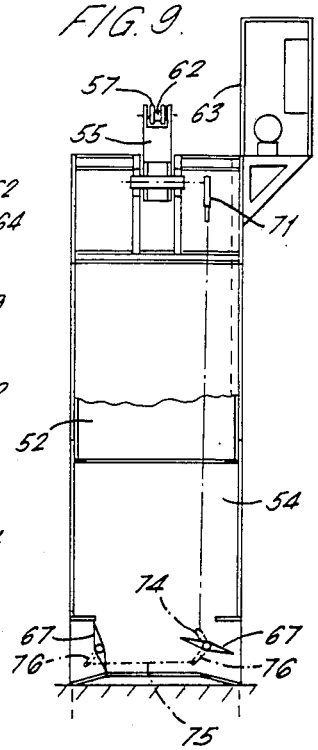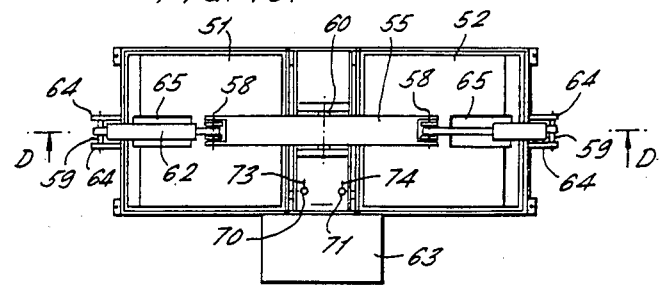

WATER ENGINE

This application is a continuation-in-part of our application No. 583,546 filed on the Feb. 24, 1984, abd.

FIELD OF THE INVENTION

The invention is concerned with water engines of the kind having a float reciprocable vertically in a chamber, and in particular relates to a water engine having an arrangement of at least two such floats in chambers.

BACKGROUND TO THE INVENTION

The basic technology of float-in-chamber type water engines is to be found in U.S. Pat. No. 4,586,333 issued on the May 6, 1986 to the same Assignee as in the present application. The present application is a development from the basic water engine disclosed in said U.S. Pat. No. 4,586,333.

BRIEF SUMMARY OF THE INVENTION

In one of its aspects, the present invention provides a water engine of the kind having at least two chambers, a float in each chamber, means mounting each float for vertical reciprocal movement in its respective chamber, means for supplying water from a head of water to each chamber to cause the float in each chamber to rise, means for exhausting water from each chamber to allow the float in each chamber to fall, and means for controlling the water supplying and exhausting means to provide inlet an outlet of water to and from each chamber in turn so that the floats in the chambers are caused to alternately rise and fall in turn one after another, and further comprising a rocking beam, means mounting the rocking beam for pivotal movement about a substantially horizontal axis, means connecting the at least two floats to the rocking beam, one to either side of the said axis, whereby the alternate rise and fall of the floats in their respective chambers causes the rocking beam to oscillate, means being provided for deriving power from the oscillatory movement of the rocking beam, said controlling means comprising a single valve member mounted for movement between one position directing water to one chamber while allowing water to exhaust from the other chamber, and another position directing water to the other chamber while allowing water to exhaust from the one chamber.

The valve member may be mounted in a single water channel providing a single water inlet and a single water oulet to the engine.

In another aspect, the invention also provides a water engine of the kind having at least two chambers, a float in each chamber, means mounting each float for reciprocal movement in its respective chamber up and down a vertical longitudinal axis, means for supplying water from a head of water to each chamber to cause the float in each chamber to rise, means for exhausting water from each chamber to allow the float in each chamber to fall, and means for controlling the water supplying and exhausting means to provide inlet and outlet of water to and from each chamber in turn so that the floats in the chambers are caused to alternately rise and fall in turn one after another, a rocking beam, means mounting the rocking beam for pivotal movement about a substantially horizontal axis, means connecting the at least two floats to the rocking beam, one to either side of the said axis, whereby the alternate rise and fall of the floats in their respective chambers causes the rocking beam to oscillate, and means for deriving power from the oscillatory movement of the rocking beam which compensates for the variable force exerted by the floats on the rocking beam during the stroke, in which the means mounting each float for vertical reciprocal movement in its respective chamber comprises a direct pivotal connection of the float to the rocking beam at the upper end of the float and guide means cooperating between the float and the chamber at the lower end of the float, said direct pivotal connection being between a fixed point on the rocking beam and a fixed point on the upper end of the float or on a member fixed to the upper end of the float, the point of said direct pivotal connection moving in an arcuate path as the float reciprocates in the chamber which, in combination with the guide means, causes the float to tilt relative to said vertical longitudinal axis as the float reciprocates up and down, each float and its respective chamber being configured to permit said tilting of the float as it reciprocates.

In the case where the walls of the chamber are parallel with the longitudinal axis of the chamber, the floats are configured to be upwardly tapering from their lower ends, giving the necessary clearance to compensate for tilting of the floats during their stroke.

The guide means cooperating between the float and the chamber may advantageously comprise a skirt extending around the lower periphery of the float. As well as guiding the float, the skirt has the additional advantage of enabling shorter floats to be used in the engine. Ordinarily in engines of this kind, the float has to be at least twice as high as the difference between upper and lower water levels in order for the float to work on both up and down strokes. Using the skirt, however, much shorter floats can be used instead whilst still enabling the floats to work on both up and down strokes. This means in practice that an engine does not have to be specially tailored to suit a particular anticipated head condition, but will be able to function properly over a wide range of prevailing heads. This makes the engine much more adaptable in practice and also reduces the depth of excavation.

Some embodiments of the invention will now be described, by way of example, with reference to the accompanying drawings, in which;

FIG. 1 is a sectional end elevation of a water engine according to the invention;

FIG. 2 is a sectional end elevation corresponding to FIG. 1 but showing the engine in a different position;

FIG. 3 is a plan view of the engine of FIG. 1 and 2, showing the line of section of those Figures at A—A;

FIG. 4 is a sectional side elevation of the engine taken along the line B—B of FIG. 3;

FIG. 5 is a sectional end elevation of another water engine embodying the invention, having a different valve arrangement from the first engine;

FIG. 6 is a sectional plan view of the engine of FIG. 5;

FIG. 7 is a sectional plan view corresponding to FIG. 6 but showing the valve member in a different position;

FIG. 8 is a sectional end elevation of a third engine embodying the invention;

FIG. 9 is a sectional side elevational of the engine of FIG. 8, taken along the line C—C of FIG. 8; and FIG. 10 is a plan view of the engine of FIG. 8, showing the line of section of the latter Figure at D—D.

Referring first to FIGS. 1 to 4, the first engine generally indicated 1 comprises a pair of water chambers 10 and 11 in which respective floats 12 and 13 are arranged to rise and fall under the action of water.

As can be seen from FIG. 3, the engine 1 is aranged in a natural water channel to create and thereby derive energy from a differential water head as shown at 21 in FIG. 4, the upper and lower water levels being separated by a wall 15. A bypass channel 22 controlled by a weir 23 allows some water to bypass the engine 1, carrying for example unwanted matter such as rubbish to prevent such matter entering the engine 1.

The floats 12, 13 are guided for generally vertical movement by guides 14 and have attached at their upper ends masts 17. Each mast 17 is pivotally attached to a respective rod 18 mounted slideably in a tubular beam 25. The beam 25 is mounted for pivotal movement about a substantially horizontal axis, indicated at 26, on a frame 27.

A trunnion 28 and struts 29 are secured together and to the beam 25 so as to form a rigid beam framework and oscillation of this beam framework about the axis 26 is used to drive hydraulic rams 30 pivoted at each of their ends to the beam framework and to the frame 27. The rams 30 are shown with their pistons attached to the beam framework and their cylinders attached to the frame 27 but this arrangement could of course be reversed.

The hydraulic rams 30 are connected into a hydraulic circuit for the purpose of deriving useful work from the oscillation of the beam 25 caused by the floats 12 and 13. The hydraulic circuit could for example be similar to that described in the aforesaid U.S. Pat. No. 4,586,333.

Flow of water to and from the chambers 10, 11 is controlled by a valve 35 located generally between the chambers. This valve comprises an inlet valve member 36 and an outlet valve 37 mounted for rotation about a horizontal axle 38. The inlet valve member 36 admits water alternately to the chambers while the outlet valve member 37 allows flow of water out from each chamber in turn. The movements of the valve members 36 and 37 are synchronised so that member 36 directs water to one chamber while member 37 permits exhaust of water from the other chamber.

In the position of the engine shown in FIG. 1, the valve member 36 is admitting water to the chamber 10, thus causing the float 12 to rise, while the member 37 is allowing water to exhaust from the chamber 11 so that the float 13 falls under action of gravity. In the position shown in FIG. 2, the floats 12 and 13 have completed their upward and downward travel respectively, the valve members 36 and 37 have changed over to their opposite positions thus reversing the situation and so the float 12 falls and the float 13 rises. The valve members change over again and the engine continues to cycle in this manner.

The valve members 36 and 37 may be operated by any suitable mechanical, hydraulic or electrical means. Preferably, the valve members are driven by some of the power produced by the engine itself with the hydraulic rams.

FIGS. 5 to 7 show another water engine 40 which is similar in some respects to the engine 1, corresponding features being shown by the same reference numerals primed. The engine 40 differs from the engine 1 primarily in that a different valve arrangement is used. In this case, there is only one valve member 43 which is mounted on a shaft 48 journalled in bearings above and below the member 43 so as to be rotatable about a generally vertical axis. This member admits water to one chamber while allowing exhaust of water from the other chamber, as will be appreciated from FIGS. 6 and 7. Thus each chamber has a single port acting both as inlet and outlet. In the position shown in FIG. 6, the valve member 43 is in a first position directing water into the chamber 10' thus causing the float 12' to rise. At the same time the valve member 43 is preventing (substantially) flow of water into the chamber 11' and allowing exhaust of water therefrom downstream. Thus the float 13' falls under influence of gravity. As the float 12' reaches its highest point and the float 13' its lowest point, as seen in FIG. 5, the valve member 43 changes over to a second position as shown in FIG. 7 so that water flows into the chamber 11' and out from the chamber 10'. Thus the float 13' rises and the float 12' falls. The engine continues to cycle in this manner.

The valve member 43 also has a "neutral" position as shown in dotted lines in FIG. 6. In this mid-position the valve member permits direct flow of water through the engine, for example during the sluicing phase at the end of each run of tide in a tidal situation, and disenables operation of the engine.

The valve member 43 is of the butterfly type and again can be operated by any convenient means, such as that described in the aforesaid U.S. Pat. No. 4,586,333.

The valve member 43 may be rotated back and forth between the positions in oscillatory fashion or may be rotated in a single direction.

The masts 17' are connected to a pivotally mounted beam driving hydraulic rams, such as shown in the embodiment of FIGS. 1 to 4 or the embodiment of FIGS. 8 to 10 described hereinafter.

The water engine 50 shown in FIGS. 8 to 10 is similar in certain respects to the engine of FIGS. 1 to 4, having two floats 51, 52 arranged to rise and fall in respective chambers 53, 54. The floats are of generally square cross-section and have masts 57 attached thereto which are pivoted at 58, the latter being pivotably mounted at 60 between the chambers, as for beam 25. Here, however, the guides 14 of the earlier described engine have been dispensed with. Instead, there is a direct pivotal connection at the top of the floats to the beam, whilst the lower end of the floats are guided for reciprocal movement up and down in the chamber. This direct pivotal connection between floats and beam results, as will be appreciated, in the floats tracing arcuate paths in the chambers. To compensate for this, the floats are tapered, along their side walls, upwardly from their lower ends. The floats may advantageously have a skirt extending around their lower peripheral edge cooperating with the inner wall of the chamber in guiding the float. In addition to guiding the floats, these skirts enable shorter floats to be used than would otherwise be possible. Ordinarily the floats would have to be twice as high as the difference in height between upper and lower water levels in order that the floats work on both up and down strokes. Using the skirt, however, the floats can still operate on both up and down strokes, but can be much shorter in height. This has the advantage that the engine is readily able to operate under variable or changing head conditions, making the engine very adaptable in practice. Also, the headroom occupied by the engine above the water level is greatly reduced.

Power is derived from the beam movement by two hydraulic rams 62 which deliver high pressure fluid to a machinery house 63 (well above water level), from where energy is delivered in whatever form is required. The rams 62 are connected at one end to pivots 58 and at the other end are pivoted at 59 to brackets 64 secured to the chamber walls. As can be seen from FIG. 10, the ends of the ram rods locate in the forked ends of the masts 57, which ends themselves locate in the forked ends of the beam 55.

The floats are formed with insets 65 for receiving the rams 62 when the floats are at their highest points (as shown by float 52 in FIG. 8), so that the rams do not foul the movement of the floats.

Flow of water into and out of each chamber is controlled by a set of two butterfly valves 67 therebeneath rotatably mounted about their mid points for movement between closed positions (see the left hand valve in FIG. 9) and open positions (see the right hand valve in FIG. 9). The valves 67 may be operated by any suitable mechanical, electrical or hydraulic means, such as that described in the aforesaid U.S. Pat. No. 4,586,333. In this embodiment, each pair of valves 67 is operated by a respective hydraulic ram, 70, 71 which is connected to a respective bell crank 73, 74 secured on the shaft of one of the valves of each pair. The rams are operated by pressurized fluid from the machinery house, and are controlled by hydraulic valves (not shown) actuated by movement of the beam so as to operate in synchronism 180° out of phase. The valves may be interconnected mechanically; for example, each valve of one set may be connected to the coaxial valve of the other set by a common shaft; and the two valves of each set may be linked by gearing, a chain and sprockets, or by cranks and levers. In the embodiment the valves of each set are linked by a respective rod 75 pivoted at its ends to cranks 76 fixed to the shafts of the valves 67. For clarity, the rods 75 and cranks 76 are not shown in FIG. 10.

Operation of the engine 50 is otherwise similar to engine 1.

The rocking beam power takeoff system featured in the above embodiments results in several advantages. Its simplicity and robustness will be self evident. The power output is considerably more constant than with single chamber engines. Only two hydraulic rams replace the eight rams that would be required in two single chamber engines as described in the aforesaid U.S. Pat. No. 4,586,333, giving a simpler and cheaper arrangement. The embodiments are suitable for both river and tidal applications; operation can be with the flow or water in either direction.

A further benefit is the more regular flow in the water passing into and from the engine, thus reducing the undesirable effect of accelerating and decelerating large masses of water, since the water moves into and out of the engine nearly all the time instead of only half the time.

What is claimed is:

1. A water engine of the kind having at least two chambers, a float in each chamber, means mounting each float for vertical reciprocal movement in its respective chamber, means for supplying water from a head of water to each chamber to cause the float in each chamber to rise, means for exhausting water from each chamber to allow the float in each chamber to fall, and means for controlling the water supplying and exhausting means to provide inlet an outlet of water to and from each chamber in turn so that the floats in the chambers are caused to alternately rise and fall in turn one after another, and further comprising a rocking beam, means mounting the rocking beam for pivotal movement about a substantially horizontal axis, means connecting the at least two floats to the rocking beam, one to either side of the said axis, whereby the alternate rise and fall of the floats in their respective chambers causes the rocking beam to oscillate, means being provided for deriving power from the oscillatory movement of the rocking beam, said controlling means comprising a single valve member mounted for movement between one position directing water to one chamber while allowing water to exhaust from the other chamber, and another position directing water to the other chamber while allowing water to exhaust from the one chamber.

2. An engine as claimed in claim 1 wherein the valve means is located generally beneath the chambers.

3. An engine as claimed in claim 1 wherein the valve member is mounted in a single water channel providing a single water inlet and a single water outlet to the engine.

4. An engine as claimed in claim 1 wherein the power means comprises at least one hydraulic ram.

5. An engine as claimed in claim 4 wherein there is a respective hydraulic ram connected to each end of the beam.

6. A water engine of the kind having at least two chambers, a float in each chamber, means mounting each float for reciprocal movement in its respective chamber up and down a vertical longitudinal axis, means for supplying water from a head of water to each chamber to cause the float in each chamber to rise, means for exhausting water from each chamber to allow the float in each chamber to fall, and means for controlling the water supplying and exhausting means to provide inlet and outlet of water to and from each chamber in turn so that the floats in the chambers are caused to alternately rise and fall in turn one after another, a rocking beam, means mounting the rocking beam for pivotal movement about a substantially horizontal axis, means connecting the at least two floats to the rocking beam, one to either side of the said axis, whereby the alternate rise and fall of the floats in their respective chambers causes the rocking beam to oscillate, and means for deriving power from the oscillatory movement of the rocking beam which compensates for the variable force exerted by the floats on the rocking beam during the stroke, in which the means mounting each float for vertical reciprocal movement in its respective chamber comprises a direct pivotal connection of the float to the rocking beam at the upper end of the float and guide means cooperating between the float and the chamber at the lower end of the float, said direct pivotal connection being between a fixed point on the rocking beam and a fixed point on the upper end of the float or on a member fixed to the upper end of the float, the point of said direct pivotal connection moving in an arcuate path as the float reciprocates in the chamber which, in combination with the guide means, causes the float to tilt relative to said vertical longitudinal axis as the float reciprocates up and down, each float and its respective chamber being configured to permit said tilting of the float as it reciprocates.

7. A water engine as claimed in claim 6 wherein the walls of the chamber are parallel with said longitudinal axis and the floats are configured to be upwardly tapering from their lower ends.

8. A water engine as claimed in claim 6 wherein the guide means cooperating between the float and the chamber comprises a skirt extending around the lower periphery of the float.

* * * * *